May 5, 1959     F. S. RIGGS     2,884,984
RIM STRUCTURE

Filed Feb. 25, 1953     2 Sheets-Sheet 1

INVENTOR.
FREDERICK S. RIGGS
BY
*R. L. Miller*
ATTORNEY

INVENTOR.
FREDERICK S. RIGGS

United States Patent Office 2,884,984
Patented May 5, 1959

2,884,984

RIM STRUCTURE

Frederick S. Riggs, Akron, Ohio, assignor, by mesne assignments, to The Goodyear Tire & Rubber Company, a corporation of Ohio Application February 25, 1953, Serial No. 338,715

1 Claim. (Cl. 152—410)

This invention relates to rims, and, more particularly, to rims adapted for mounting a tubeless tire thereon.

Heretofore, the use of tubeless tires primarily has been confined to tires mounted on one-piece rims, usually of the drop-center type. To provide an airtight one-piece rim presents no particular problem but in providing an airtight multiple-piece rim, considerable difficulty is encountered in effecting a permanent practical seal between the component parts. It is highly desirable that any sealing means require a minimum of alterations to the various multiple-piece rim constructions in use at the present time so that the rims presently in use may be readily converted to airtight rims for use with tubeless tires.

It is a general object of the invention to provide means for sealing a multiple-piece rim.

It is a furthert object to provide a sealing means that is economical and simple to construct.

Another object is to provide sealing means that is readily adaptable to many of the present-day rim constructions.

A still further object of the invention is to provide sealing means that may be easily installed during the assembly of the rim.

Other objects and advantages of this invention will become apparent hereinafter as the description thereof proceeds, the novel features, arrangements and combination being clearly pointed out in the specification as well as the claim thereunto appended.

Figure 1:
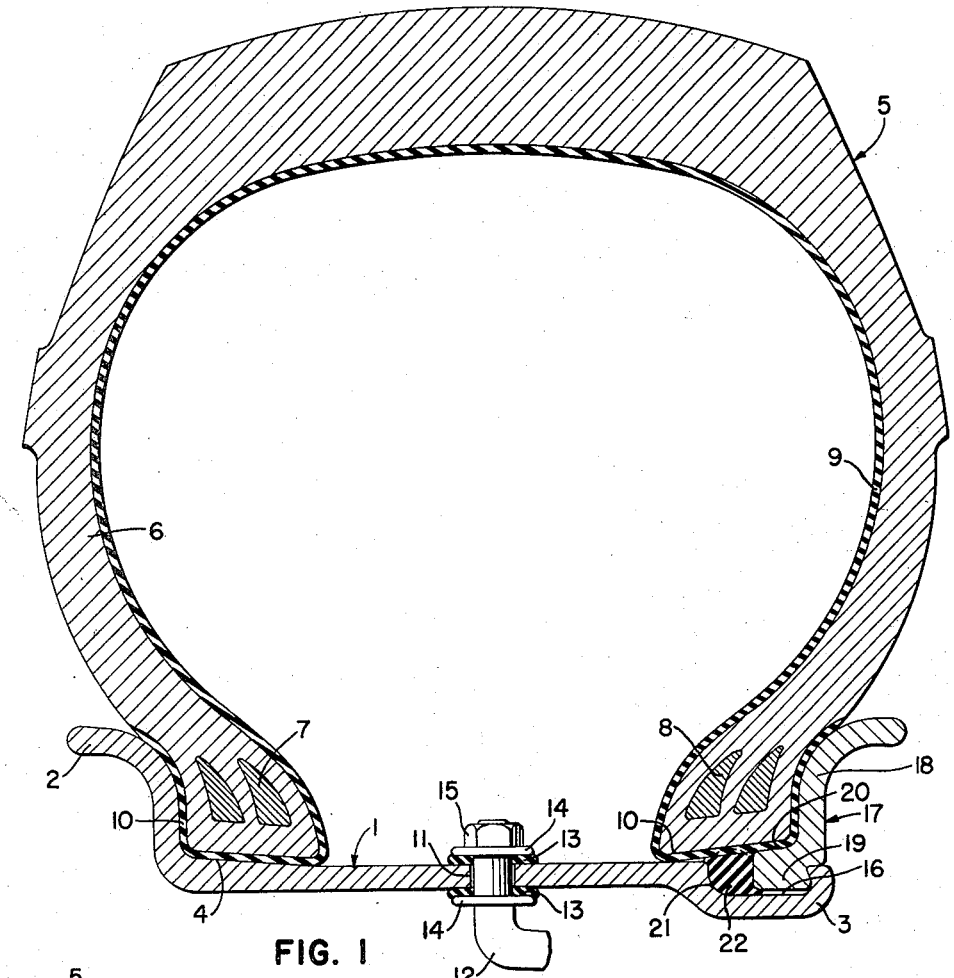

In the drawings Fig. 1 is a cross-sectional view of a rim incorporating the principles of the invention; and Figs. 2, 3, 4 and 5 are fragmentary cross-sectional views of the invention as applied to other rim structures.

The invention is applied to several of various types of rims in everyday use and in each rim an elastic deformable sealing element is located in a substantially closed cavity or chamber. The sealing element or gasket is a separate element that is placed in the cavity during the assembly of the rim after the tire is in place. The cavity is located generally between the air chamber of the tire and the various joints between the parts of the rim structure. With the tire mounted on the rim and the various parts of the rim in the assembled position, the sealing element is subjected to radial compression by the parts of the rim which distort the seal so as to form an airtight seal with the adjacent surfaces. By placing the sealing element in a position between the air chamber and the joints, only one sealing element is required to seal the possible passageways through which the air pressure might escape and as the sealing element itself is separate, it is relatively inexpensive and easily installed and replaced when necessary. The air pressure acts to force the sealing element outwardly against the joints to be sealed, thus increasing the effectiveness of the seal.

More particularly in the forms of the invention illustrated in the drawings, the numeral 1 indicates generally an endless rim base portion having an integral side flange 2 adjacent one side and an integral gutter edge portion 3 on the opposite side of the base portion. For the purposes of illustration, the base portion 1 in each of the modifications shown in the drawings is provided with a bead seat 4 adjacent the integral side flange 2 adapted to receive thereon one of the tire beads of a straight-sided open beaded pneumatic tire 5 in airtight relationship.

The tire 5 as illustrated generally represents a fabric body tire carcass 6 having substantially inextensible bead portions 7 and 8 which may be made impervious to air by lining the inner side of the carcass with a layer 9 of an air-impervious plastic material. In order that the beads may be hermetically sealed on the rim structure, it is desirable to provide a layer 10 of elastic deformable material about the bead portions 7 and 8 of the tire 5 which contact the rim structure so that under the influence of the air pressure within the tire carcass the beads are sealed to the flanges in airtight relationship. The layer 10 preferably is ribbed or serrated to more easily effect a seal when the beads are formed against the retaining flanges. These practices are well known in the art.

As illustrated in Fig. 1 the rim base 1 is provided with an opening 11 through which a valve stem 12 is inserted and sealed in airtight relationship to the base structure. For example, rubber gaskets 13 may be placed between the valve flanges 14 of the valve stem 12 and the rim base 1 so that when the nut 15 on the valve stem is tightened, the air cannot leak or escape from around the valve stem 12. Thus the air enters the interior of the tire carcass directly through to the valve 12 and no inner tube is used in an assembly of this type.

In Fig. 1 the gutter edge portion generally provides a U-shaped outwardly facing channel 16 in which a split locking ring 17 having an integral bead-retaining flange 18 has a downwardly extending portion 19 to engage the channel 16 to lock the ring 17 into place. The upper surface 20 of the inwardly extending portion forms a portion of the bead seat for the tire bead 8 and extends inwardly to a point short of the inner edge of the channel so as to provide a peripheral groove 21 between the retaining flange and the inner edge of the channel around the periphery of the rim. The toe portion of the tire bead 8 rests on the rim base 1 and forms in combination with the groove, an enclosed chamber between the tire bead and rim assembly. The various parts of the rim structure when assembled are in a predetermined relationship with each other and if desired, the rim may be used with a standard tire and tube. It is not necessary that the sealing element be in place to have an operable rim structure.

A separate endless resilient deformable sealing element 22 of plastic material such, for example, as rubber, is located in the groove 21 between the downwardly extending portion 19 of the split ring 17 and the rim base 1. By rubber is meant either natural or synthetic or any of the plastic materials having the physical characteristics of rubber. When the tire 5 is moved into the assembled position, the seal 22 is distorted under compression to seal the joints between split ring 17 and rim base 1 which prevents air pressure in the tire from leaking between the tire bead 8 and the retaining flange 18 or between the retaining flange 18 and the gutter edge 16 of the rim. The sealing element 22 may be made of any desired shape and is illustrated as being of round cross-section similar to the well-known O ring seals indicated by the dotted line and distorted under radial compression upon assembly of the rim and tire to fill the chamber as indicated in the drawing. The separate sealing element 22 preferably is formed of a material that has high abrasion and heat resistance so that it will function satisfactorily for sustained periods of time.

It is believed that the operation of the structure will be apparent, but in review, with the split ring 17 removed from rim base 1, the tire 5 is slipped over the rim base 1. The resilient seal 22 is then placed in the channel 16 along the inner edge thereof. The split ring 17 is moved laterally onto the rim base 1, the beads 7 and 8 of the tire yielding inwardly toward each other until the downwardly extending portion 19 of the ring drops down into the channel 16 and locks the ring into place. This partially distorts the seal 22. Thereupon the tire is inflated through the valve 12 which forces the beads 7 and 8 outwardly against the retaining flanges 2 and 18, respectively, and seals them in airtight relationship. The seating of the bead 8 further distorts the seal 22 radially inwardly so as to fill the enclosed cavity and complete the seal between the joints of the ring 17 and adjacent parts to prevent any of the air pressure from escaping through the joints. To remove the tire, the operations are reversed. When the rim and tire are disassembled, it is preferable to replace the seal 22 before reassembling the rim and tire.

Figure 2:
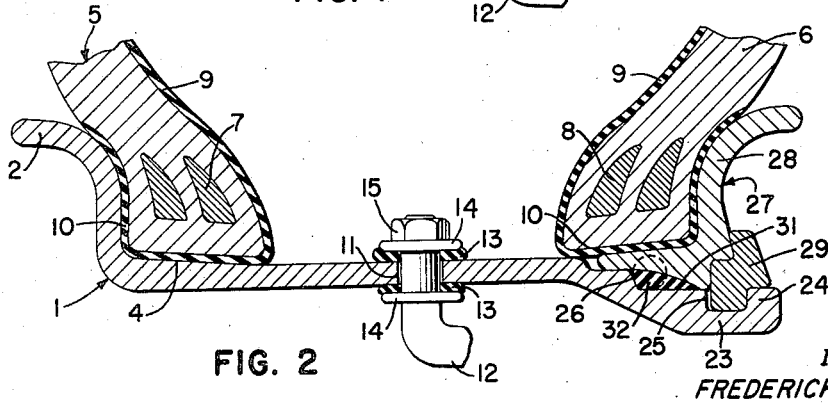

In the modification shown in Fig. 2, the rim base 1 with the integral side flange 2 adjacent one side thereof and an integral gutter edge portion 23 adjacent the other side. The gutter edge portion 23 includes the outwardly facing channel 24 along the outer edge and shoulder portions 25 and 26 inward from the channel adapted to receive and position the endless bead seat ring 27 with the integral bead retaining flange 28. The split locking ring 29 is adapted for engagement with the channel 24 and the ring 27 to assist in positioning the ring 27 and lock it in place on the rim base 1.

The ring 27 includes the inwardly extending portion 30, the upper surface thereof forming the seat for the bead 8 of tire 5. A portion of the inner periphery of portion 30 forms with the shoulder 25, a circumferentially extending enclosed cavity 31 in which a resilient deformable sealing element 32 is compressed radially by the portion 30 of ring 27 to substantially fill the cavity when the ring 27 is moved into the assembled position. The seal 32 may be of any desired configuration and, as shown, is of round cross-section before being distorted. The compressive forces in the element 32 effectively prevent the air pressure within the tire from escaping through the joints of the rim structure.

Figure 3:
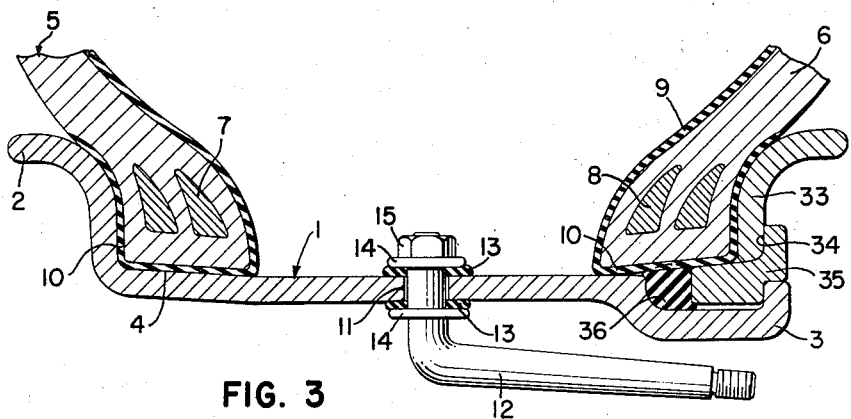

Fig. 3 illustrates a modification of the rim structure described and shown in Fig. 1 in which the retaining flange 33 is an endless ring engaging shoulder 34 of the split locking ring 35 and the rim base 1 and locking ring 35 form a channel into which the sealing element 36 is placed. Upon mounting the tire 5 on the rim and assembling the retaining flange ring 33 and locking ring 35, the sealing element 36 is compressed radially to seal the joints between the retaining ring 33 and the locking ring 35 and the rim base 1 and locking ring 35 to prevent the escape of air pressure from within the tire through the joints.

Figure 4:
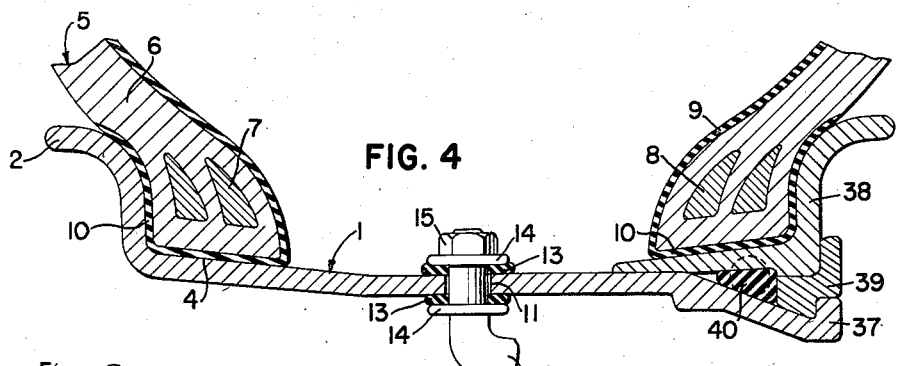

Another rim construction to which the invention may be adapted is shown in Fig. 4. The rim base 1 has an integral side flange 2 adjacent one side thereof and the gutter edge portion 37 adjacent the opposite side. The bead seat ring 38 having an integral side flange formed therewith is an endless band and the upper surface of the laterally extending portion forms the seat for bead 8 of the tire 5. The split locking ring 39 engages the gutter edge portion 37 and the bead seat ring 38 to hold the bead seat ring 38 in the proper position with respect to the rim base 1. A circumferential enclosed cavity is formed between the inwardly extending portion of the bead seat ring 38, a portion of the gutter edge of the rim base 1 and the split locking ring 39. A separate elastic deformable sealing element 40 is compressed radially in this cavity when the parts of the rim are assembled to effectively seal the joints between the parts of the rim assembly to prevent air pressure from escaping through the joints.

Figure 5:
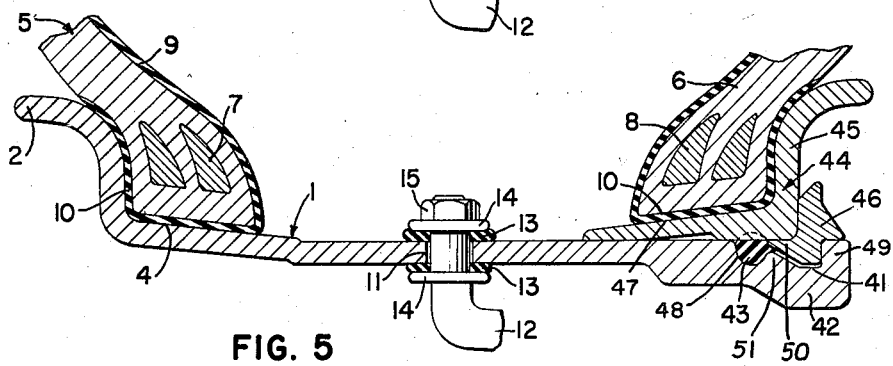

In Fig. 5 another modification of the invention is illustrated in which a circumferential groove inwardly of the outwardly facing channel 41 of the gutter edge portion 42 of the rim base 1 is adapted to receive a separate elastic deformable gasket 43. The endless bead band or flange ring 44 having an integral side flange 45 and bead seat portion 47 upon assembly with the rim base forms an enclosed cavity 48 in which the sealing element is compressed radially to effectively seal the joints between the parts of the rim assembly. The bead band is held in place by the split locking ring 46 which engages the outwardly facing channel portion and the locking flange 49 of the gutter edge 42 of the rim base 1 and the bead band 44. A lug portion 50 is formed integrally on the split locking ring 46 and this lug portion extends axially inwardly of the channel 41 to substantially the axially outer edge 51 of the groove 48. Accordingly, when the gasket 43 and associated rim parts are in assembled position, the gasket is in contact with the lug portion 50, forming therewith and with the rim base and tire bead flange an airtight seal to prevent escape of air between the rim parts when a tubeless tire is mounted on the rim.

Although the foregoing description has described the application of the invention to rims having an integral side or bead-retaining flange adjacent one side of the rim base, it is readily apparent that the invention could be adapted for application to both sides of a rim. While certain representative embodiments and details have been shown for the purpose of illustrating the invention, it will be apparent to those skilled in this art that various changes and modifications may be made without departing from the spirit or scope of the invention.

I claim:

A tubeless tire wheel assembly comprising a substantially cylindrical endless rim base; an endless tire bead retaining flange along one edge of the rim base; a radially outwardly facing annular channel formed adjacent the opposite edge of the rim base; a radially extending locking flange formed integrally with said opposite edge of the rim base and forming the outer side of the channel; a tire bead flange ring including an endless bead-retaining flange with an integral axially inwardly extending bead-seat portion adapted to slidably engage the rim base; a separate circumferentially extending seal-retaining groove formed in the radially outer face of said rim base, adjacent said channel and radially inwardly and within the axial extent of said bead seat portion of said flange ring when said flange ring is in the assembled position; a split locking ring removably mounted in said channel in a predetermined relationship therewith to engage the flange ring to retain the same in a predetermined assembled position; a lug portion formed integrally on said locking ring and extending axially inwardly of said channel to substantially the axially outer edge of said groove; said groove, locking ring and adjacent rim parts defining a cavity; and a separable resilient deformable seal of a cross-sectional area no larger than that of said cavity disposed in said cavity and distorted under radial and axial compression by said bead seat portion of said flange ring when in assembled position so as to be in contact with said ring lug portion forming an airtight seal between the rim base, tire bead flange ring and locking ring to prevent escape of air between the rim parts when a tubeless tire is mounted on the rim.

References Cited in the file of this patent

UNITED STATES PATENTS

| 1,132,898 | Austin | Mar. 23, 1915 |
| 1,493,040 | Klaus | May 6, 1924 |
| 2,587,470 | Herzegh | Feb. 26, 1952 |
| 2,822,021 | Shipman et al. | Feb. 4, 1958 |

FOREIGN PATENTS

| 305,533 | Great Britain | Oct. 10, 1929 |
| 713,369 | France | Aug. 11, 1931 |